(12) United States Patent
Lee et al.

(10) Patent No.: US 8,062,795 B2
(45) Date of Patent: Nov. 22, 2011

(54) SEPARATOR AND ELECTROCHEMICAL DEVICE COMPRISING THE SAME

(75) Inventors: Sang-Young Lee, Daejeon (KR); Dae-Jong Seo, Daejeon (KR); Dong-Myung Kim, Daejeon (KR); Seok-Koo Kim, Daejeon (KR); Hyun-Min Jang, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/442,585

(22) PCT Filed: Sep. 21, 2007

(86) PCT No.: PCT/KR2007/004665
§ 371 (c)(1),
(2), (4) Date: Jul. 9, 2010

(87) PCT Pub. No.: WO2008/038971
PCT Pub. Date: Apr. 3, 2008

(65) Prior Publication Data
US 2010/0285371 A1    Nov. 11, 2010

(30) Foreign Application Priority Data

Sep. 25, 2006  (KR) .................. 10-2006-0093057

(51) Int. Cl.
| | |
|---|---|
| *H01M 2/16* | (2006.01) |
| *C08L 27/16* | (2006.01) |
| *B32B 5/00* | (2006.01) |
| *B32B 3/26* | (2006.01) |
| *B05D 1/12* | (2006.01) |
| *C01G 51/04* | (2006.01) |
| *C01G 49/06* | (2006.01) |
| *C01G 23/04* | (2006.01) |
| *C01G 37/02* | (2006.01) |
| *C23C 14/34* | (2006.01) |
| *B29C 43/00* | (2006.01) |
| *G01J 3/46* | (2006.01) |

(52) U.S. Cl. ..................... 429/247; 428/402; 428/304.4; 524/545; 427/180; 523/594.5; 523/633; 523/598; 523/607; 204/192.26; 264/319; 356/402

(58) Field of Classification Search ................... 429/247
See application file for complete search history.

(56) References Cited

U.S. PATENT DOCUMENTS 5,298,346  A    3/1994  Gyenes
(Continued)

FOREIGN PATENT DOCUMENTS

| JP | 10064525 A | 3/1998 |
|---|---|---|
| JP | 2001307778 A | * 11/2001 |
| KR | 2000-0019372 A | 4/2000 |
| KR | 2001-0091048 A | 10/2001 |
| KR | 2002-0071204 A | 9/2002 |

(Continued)

OTHER PUBLICATIONS

International Search Report, PCT/KR2007/004665.

*Primary Examiner* — Patrick Ryan
*Assistant Examiner* — Brent Thomas
(74) *Attorney, Agent, or Firm* — Lerner, David, Littenberg, Krumholz & Mentlik, LLP (57) ABSTRACT

Disclosed is a separator comprising inorganic particle or aggregates thereof having a unique spectrum or color pattern according to a predetermined rule. Also, disclosed are an electrochemical device comprising the above separator and a method for identifying the origin or kind of the separator itself or the electrochemical device comprising the same by using the above separator. Further, disclosed is a method for manufacturing the aforementioned separator, the method comprising a step of forming a specific pattern by coating inorganic particles having a unique spectrum or color pattern on at least one area selected from the group consisting of a surface of a porous substrate and a porous part of the substrate.

19 Claims, 4 Drawing Sheets

U.S. PATENT DOCUMENTS

| | | | |
|---|---|---|---|
| 5,336,573 A * | 8/1994 | Zuckerbrod et al. | 429/252 |
| 5,882,721 A | 3/1999 | Delnick | |
| 7,005,211 B2 | 2/2006 | Kim et al. | |
| 2005/0204920 A1 | 9/2005 | Hong et al. | |
| 2006/0078791 A1* | 4/2006 | Hennige et al. | 429/145 |
| 2010/0290044 A1* | 11/2010 | Lee et al. | 356/326 |

FOREIGN PATENT DOCUMENTS

| | | |
|---|---|---|
| KR | 20040095162 A | 11/2004 |
| KR | 20060011247 A | 2/2006 |
| KR | 20060023472 A | 3/2006 |
| KR | 20080008232 A | 1/2008 |
| WO | 2006/068428 | 6/2006 |

* cited by examiner

(a) $Cr_2O_3$: $Al_2O_3$: PVdF= 80: 0: 20.

(b) $Cr_2O_3$: $Al_2O_3$: PVdF=60:20:20

(c) $Cr_2O_3$: $Al_2O_3$: PVdF=30:50:20

(d) $Cr_2O_3$: $Al_2O_3$: PVdF=10:70:20

(a) polyolefin-based (b) non-woven-based

SEPARATOR AND ELECTROCHEMICAL DEVICE COMPRISING THE SAME

CROSS REFERENCE TO RELATED APPLICATIONS

The present application is a national phase entry under 35 U.S.C. §371 of International Application No. PCT/KR2007/004665, filed Sep. 21, 2007, published in English, which claims the benefit of Korean Patent Application No. 10-2006-0093057, filed Sep. 25, 2006. The disclosures of said applications are incorporated by reference herein.

TECHNICAL FIELD

The present invention relates to an identifiable separator that allows users to easily identify the origin or kind of the separator itself or an electrochemical device using the same separator. Also, the present invention relates to an electrochemical device using the above separator.

BACKGROUND ART

Electrochemical devices are power sources for electronic appliances, etc. As the use of batteries is enlarged to applications for the storage of energy for portable telephones, camcorders, notebook computers, personal computers and electric vehicles, efforts on the research and development of batteries are increasingly embodied.

Meanwhile, since the electrochemical devices have been in increasing demand, counterfeits thereof have been distributed more and more. Such counterfeits have much lower safety than authentic products. Therefore, there has been an imminent need for a method for checking the authenticity of an electrochemical device.

According to the prior art, there has been suggested a method for checking the authenticity of an electrochemical device by incorporating a semiconductor capable of communicating with the main body of an electronic appliance into the electrochemical device. However, the above method requires an additional space for housing the semiconductor inside the device, so that the space for receiving electrodes inside the device grows smaller. This ultimately results in a drop in the capacity of a battery. Additionally, such introduction of a semiconductor into the electrochemical device causes degradation of the productivity and cost-efficiency.

DISCLOSURE

Technical Problem

Therefore, the present invention has been made in view of the above-mentioned problems. It is an object of the present invention to provide a separator which inorganic particle(s) having a unique spectrum or color pattern is(are) introduced according to a predetermined rule, so that the separator is identifiable and the separator or an electrochemical device using the same allows users to identify its origin or kind.

Technical Solution

In order to achieve the above-mentioned object, there is provided a separator comprising inorganic particle or aggregates thereof having a unique spectrum or color pattern according to a predetermined rule. Also, there is provided an electrochemical device comprising the above separator. Further, there is provided a method for identifying the origin or kind of the separator itself or the electrochemical device comprising the same by using the above separator.

Further, there is provided a method for manufacturing the aforementioned separator, the method comprising a step of forming a specific pattern by coating inorganic particles having a unique spectrum or color pattern on at least one area selected from the group consisting of a surface of a porous substrate and a porous part of the substrate.

Hereinafter, the present invention will be explained in more detail.

An electrochemical device includes an anode, a cathode, a separator, and an electrolyte. Herein, the separator can prevent electric contact of the anode and the cathode while allowing ions to pass through the separator. As a separator a polyolefin-based or non-woven-based porous substrate having no color or a pale yellow color has been mainly used. There has been no case where a separator was used to identify the origin or kind of the separator itself or an electrochemical device.

According to the present invention, inorganic particle(s) having a unique spectrum or color pattern is(are) introduced into the separator according to a predetermined rule, so as to make the separator itself identifiable.

Each kind of inorganic particle has its unique spectrum or color pattern. Therefore, when such inorganic particle(s) is(are) introduced into a separator according to a predetermined rule, the separator comprising the inorganic particle(s) can be identifiable like a trademark.

Herein, the above "predetermined rule" means a specific spectrum (peak position and intensity) and/or color pattern determined preliminarily so that the separator according to the present invention can be distinguished from the others manufactured by a third party. Particularly, the specific spectrum (peak position and intensity) and/or color pattern may be variable depending on the number, kind, content, etc. of the inorganic particles used in the separator. For example, it is possible to control the peak position and intensity by using one or more kinds of inorganic particles having a unique spectrum or color pattern and by adjusting the amounts of the particles. Otherwise, it is possible to control the color pattern by using one or more kinds of inorganic particles having a unique spectrum or color pattern in the visible light or non-visible light range; or one or more kinds of inorganic particles having a unique spectrum or color pattern under a specific chemical condition (e.g. temperature, oxidation state, etc.). Further, it is possible to control both the spectrum and the color pattern by using at least two kinds of the aforementioned inorganic particles in combination or by varying the arrangement of the particles.

Therefore, according to the present invention, it is possible to identify the origin or kind of the separator itself or the electrochemical device comprising the same by checking the spectrum and/or color pattern of the separator. Particularly, according to the present invention, the separator itself functions as a means for identification. Thus, no additional space for an identification means is required, thereby preventing a drop in the capacity of the electrochemical device. Also, the identification method according to the present invention may be applied to counterfeits made only inside the electrochemical device.

There is no particular limitation in the inorganic particle used in the present invention, as long as the particle has its unique spectrum or color pattern.

For example, the inorganic particle includes: (i) inorganic particles having a unique spectrum or color pattern in the visible light range; (ii) inorganic particles having a unique spectrum or color pattern in the non-visible light range; or (iii)

inorganic particles having a unique spectrum or color pattern under a specific chemical condition (e.g. temperature or oxidation state). In addition, inorganic particles having a unique spectrum or color pattern through coloring belong to a scope of the present invention. In this case, the coloring may be achieved through a surface treatment by dye having a unique spectrum or color pattern. Also, inorganic particles used in paints or pigments, or phosphor particles used in display devices or lamps may be used in the present invention.

Non-limiting examples of the inorganic particle having a unique spectrum or color pattern, such as a white, black, yellow, orange, brown, red, violet, blue, green, gray, pink or fluorescent color, in the visible light range (a wavelength range of 380~770 nm) are as follows:

(a) white: $Al_2O_3$, ZnO, ZnS, $SiO_2$, $ZrO_2$, $SnO_2$, $CeO_2$, MgO, CaO, $Y_2O_3$, $TiO_2$, $Sb_2O_3$, $BaTiO_3$, $SrTiO_3$, Pb(Zr,Ti)$O_3$ (PZT), $Pb_{1-x}La_xZr_{1-y}Ti_yO_3$ (PLZT), etc.

(b) black: $Fe_3O_4$, (Co, Ni)O—(Cr, Fe)$_2O_3$, etc.

(c) yellow: $PbCrO_4$, ZnCrO4, $BaCrO_4$, CdS, FeO(OH) $nH_2O$, $TiO_2$—NiO—$Sb_2O_3$, Pb(CN)$_2$, $Ca_2PbO_4$, Al, Fe, Sn-2PbO—$Sb_2O_5$, V—$SnO_2$, V—$ZrO_2$, Pr—$ZrSiO_4$, $CrSbO_4$ or $Cr_2WO_6$—$TiO_2$, $ZrSO_4$ coated CdS or (CdZn)S, etc.

(d) orange: $PbCrO_4$ PbO, $PbCrO_4$ $PbMoO_4$ $PbSO_4$, etc.

(e) brown: $Fe_2O_3$+FeO, $Fe_2O_3$+$MnO_2$+$Mn_3O_4$, ZnO. (Al, Cr, Fe)$_2O_3$, etc.

(f) red: $Fe_2O_3$, $Pb_3O_4$, HgS, CdS+CdSe, CdS+HgS, $2Sb_2S_3$ $Sb_2O_3$, etc.

(g) violet: $CO_3(PO_4)_2$, $CO_3(PO_4)_2$ $4H_2O$, $CO_3(PO_4)_2$ $8H_2O$, etc.

(h) blue: 3NaAl $SiO_4$ $Na_2S_2$, $Fe_4$ [Fe (CN$_6$)$_3$] $nH_2O$, CoO $nAl_2O_3$, CoO $nSnO_2$ mMgO(n-1,5~3.5, m=2~6), $CO_3O_4$+$SiO_2$+$Al_2O_3$+$Fe_2O_3$+NiO+MnO, CoO-$nAl_2O_3$ or (Co, Zn)O-$nAl_2O_3$, 2 (Co, Zn)O.$SiO_2$, V—$ZrSiO_4$, etc.

(i) green: $Cr_2O_3$, $Cr_2O(OH)_4$ Cu (CH$_3$CO$_2$)$_2$ 3CuO (As O$_2$)$_2$, CoO—ZnO—MgO, (Co, Zn)O.(Al, Cr)$_2O_3$, 3CaO—$Cr_2O_3$.$3SiO_2$, (Al, Cr)$_2O_3$, etc.

(j) gray: Sb—$SnO_2$, Co, Ni—$ZrSiO_4$, etc.

(k) pink: Mn, P-α-$Al_2O_3$, ZnO.(Al, Cr)$_2O_3$, Cr—CaO.$SnO_2$. $SiO_2$, Fe—$ZrSiO_4$, Cr, Co—CaO.$SnO_2$ $SiO_2$, $ZrSiO_4$ coated Cd(S,Se), etc.

(l) fluorescent color: ZnS, $Zn_2SiO_4$, (Zn, Cd)S, CaS, SrS, $CaWO_4$, etc.

(m) others: SiC (green and/or black), $Si_3N_4$(white), etc.

In this case, it is preferred that the white inorganic particle(s) is(are) mixed with other inorganic particles, so as to diversely adjust the spectrum and/or the color patterns of the separator.

Although there is no particular limitation in the size of the inorganic particle, the inorganic particle preferably has a size of 0.001 μm~10 μm. If the size is less than 0.01 μm, the pores formed by the inorganic particles are too small. Thus, it may be difficult to function sufficiently as a separator. If the size is greater than 10 μm, the resultant separator has an increased thickness. Thus, it may result in an increase in the electrochemical device size or a decrease in the quantity of used electrode active material, thereby causing decrease in the capacity of the electrochemical.

Meanwhile, the inorganic particles may be connected and fixed to each other by polymers. Herein, for the polymer, binder polymers well-known in the art may be used. The polymer serves as a binder that interconnects and stably fixes the inorganic particles among themselves, and between the inorganic particles and the surface of an electrode substrate, and thus prevents degradation in mechanical properties of a resultant separator.

The polymer preferably has a glass transition temperature (Tg) of between −200° C. and 200° C. in order to improve mechanical properties such as flexibility and elasticity of a final resultant separator.

Additionally, the polymer preferably shows a high degree of swelling with an electrolyte by being gelled when impregnated with an electrolyte, and more preferably has a solubility parameter between 15 and 45 $MPa^{1/2}$. This is because, when the solubility parameter of the polymers is out of the above-mentioned range, it is difficult to swell the polymers with typical electrolyte for electrochemical devices.

Non-limiting examples of the polymer that may be used in the present invention include polyvinylidene fluoride-co-hexafluoropropylene, polyvinylidene fluoride-co-trichloro-ethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxylmethyl cellulose, acrylonitrile-styrene-butadiene copolymer, polyimide or mixtures thereof.

There is no particular limitation in the ratio of the inorganic particles to the polymer when preparing the separator according to the present invention. The ratio may be controlled in a range of 10:90~99:1 (on the weight basis), and preferably of 50:50~99:1 (on the weight basis), depending on the thickness and physical properties of the resultant separator and the content of the inorganic particles defined by the predetermined rule.

The separator according to the present invention may further comprise other additives.

Meanwhile, the separator according to the present invention includes a porous structure formed due to the interstitial volume between the inorganic particles. Herein, the pores may be formed with a size of micrometer in a tangled configuration between inorganic particles; or between inorganic particles and polymers or between polymers in the case where the polymers are used. The porous structure can serve as a path for transfer and movement of lithium ions when filled with subsequently injected electrolyte. Therefore, the pore size and the porosity may significantly affect the adjustment of the ion conductivity of the separator. For this reason, preferably, the pore size ranges from 0.001 to 10 μm and the porosity ranges from 5 to 95%, so as to have a sufficient room to be filled with the electrolyte and improve the lithium ion conductivity of the separator. In this case, the pore size and the porosity can be adjusted by the size of the inorganic particle, or by a content ratio (I/P) of the inorganic particle (I) to the polymers (P). For example, the larger the inorganic particles are, the larger the interstitial distance between the inorganic particles is and the larger the pore size is. Moreover, as the content ratio (I/P) of the inorganic particle (I) to the polymers (p) grows higher, the porosity may increase.

Also, according to the present invention, there is no particular limitation in the separator thickness, which can be adjusted within a range of 1 to 100 μm in consideration of the battery performance.

The separator according to the present invention may be realized by two types of embodiments, but is not limited thereto.

<Separator Example 1 of the Present Invention>

According to one embodiment of the separator according to present invention, the inorganic particle containing layer is placed on at least one area selected from the group consisting of a surface of a porous substrate and a porous part of the substrate. For example, the separator may have a structure including a porous substrate and inorganic particles coated on the substrate.

There is no particular limitation in the porous substrate, as long as it is a substrate having pores. However, a heat resistant porous substrate having a melting point of 200° C. or higher is preferred.

This is because the heat-resistant porous substrate can improve the thermal stability of the separator and thus can prevent danger that may be caused by exterior and/or interior heat stimulation.

Non-limiting examples of the porous substrate include high density polyethylene(HDPE), low density polyethylene (LDPE), linear low density polyethylene(LLDPE), ultra high molecular weight polyethylene(UHMW-PE), polyethylene terephthalate, polybutylene terephthalate, polyester, polyacetal, polyamide, polycarbonate, polyimide, polyetherether ketone, polyether sulfone, polyphenylene oxide, polyphenylene sulfidro, polyethylene naphthalene or mixtures thereof. Also, other heat resistant engineering plastics may be used with no particular limitation.

Although there is no particular limitation in thickness of the porous substrate, the porous substrate preferably has a thickness of between 1 μm and 100 μm, more preferably of between 5 μm and 50 μm. When the porous substrate has a thickness of less than 1 μm, it is difficult to maintain mechanical properties. When the porous substrate has a thickness of greater than 100 μM, it may function as resistance layer of lithium ion.

Although there is no particular limitation in pore size and porosity of the porous substrate, the porous substrate preferably has a porosity of between 5% and 95%. The pore size (diameter) preferably ranges from 0.01 μm to 50 μm, more preferably from 0.1 μm to 20 μm. When the pore size and porosity are less than 0.01 an and 5%, respectively, the porous substrate may function as resistance layer of lithium ion. When the pore size and porosity are greater than 50 μm and 95%, respectively, it is difficult to maintain mechanical properties.

The porous substrate may take the form of a membrane or fiber. When the porous substrate is fibrous, it may be a non-woven web forming a porous web (preferably, spunbond type web comprising long fibers or melt blown type web).

The separator may be manufactured by coating an inorganic particle(s) having a unique spectrum or color pattern on at least one area selected from the group consisting of a surface of the porous substrate and a porous part of the substrate. In this case, it is preferred to form a specific pattern (for example, stripes, dots, etc.) on the porous substrate, by coating the inorganic particle(s) on the entire surface, a portion of the surface, or a portion of the porous part of the porous substrate.

One embodiment of the method for the above separator comprises the steps of: (i) manufacturing an inorganic particle solution by dissolving the inorganic particles into a solvent; and (ii) drying after coating the inorganic particle solution of step (i) on at least one area selected from the group consisting of a surface of a porous substrate and a porous part of the substrate.

In this case, in step (i), polymers capable of interconnecting and fixing the inorganic particles or other additives may be additionally used.

Meanwhile, in step (i), although there is no particular limitation in the solvent, the solvent preferably has a solubility parameter similar to that of the binder polymer to be used and a low boiling point, so as to facilitate uniform mixing and removal of the solvent. Non-limiting examples of the solvent that may be used include acetone, tetrahydrofuran, methylene chloride, chloroform, dimethylformamide, N-methyl-2-pyrrolidone (NMP), cyclohexane, water or mixtures thereof.

Also, in step (i), it is preferable to perform a step of pulverizing inorganic particles after dissolving the inorganic particles into the solvent. The time needed for pulverization is suitably 1-20 hours. The particle size of the pulverized particles ranges preferably from 0.001 and 10 μm. Conventional pulverization methods (ex. ball mill, attrition mill) may be used.

And, in step (ii), the conventional coating methods known to one skilled in the art may be used. It is possible to use various processes including dip coating, die coating, roll coating, comma coating or combinations thereof.

Meanwhile, in order to coat the inorganic particles on the porous substrate, a sputtering method, preferably a sputtering method using a screen may be used. Then, it is possible to omit the step of dissolving inorganic particles into a solvent and removing the solvent. Thus, it is possible to form a pattern on the porous substrate easily and simply.

<Separator Example 2 of the Present Invention>

Another embodiment of the present invention employs a freestanding structure in which inorganic particles themselves can serve as supporters and spacers without a further supporter, such as the porous substrate. According to the present embodiment, the inorganic particles are physically interconnected and fixed while forming a porous structure.

The separator can be manufactured according to a process including the steps of: forming an inorganic particle-containing layer on a substrate (ex. Teflon sheet) according to the same method as in <separator example 1 of the present invention>; and then detaching the substrate or detaching the substrate and compressing.

Furthermore, an electrochemical device according to the present invention may comprise an anode, a cathode, a separator, and an electrolyte. In this case, the separator includes the aforementioned separator.

The electrochemical device according to the present invention includes all types of devices in which electrochemical reactions are performed. Particular examples of the electrochemical device include all types of primary batteries, secondary batteries, fuel cells, solar cells, capacitors, or the like. Examples of the secondary batteries include lithium metal secondary batteries, lithium ion secondary batteries, lithium polymer secondary batteries or lithium ion polymer secondary batteries.

The electrochemical device may be obtained by using a conventional method known to those skilled in the art, except that the separator is the aforementioned separator. For example, the method may comprise the steps of: (a) inserting the aforementioned separator between the cathode and the anode to form an electrode assembly, and introducing the electrode assembly into a casing for an electrochemical device; and (b) injecting an electrolyte to the casing.

The electrolyte may be used a conventional electrolyte known to those skilled in the art, and generally comprises an electrolyte salt and an electrolyte solvent. There is no particular limitation in the electrolyte salt, as long as the salt is conventionally used as an electrolyte salt for a non-aqueous electrolyte.

The electrolyte salt that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Br^-$, $I^-$, $ClO_4^-$, $AsF_6^-$, $CH_3CO_3^{31}$, $N(CF_3SO_2)_2^-$, $C(CF_2SO_2)_3^-$ and combinations thereof. A lithium salt is particularly preferred.

The electrolyte solvent that may be used in the present invention includes cyclic carbonates, linear carbonates, lactone, ether, ester, sulfoxide, acetonitrile, lactam, ketone, or the like. Non-limiting examples of the cyclic carbonates include ethylene carbonate (EC), propylene carbonate (PC), butylene carbonate (BC), fluoroethylene carbonate (FEC), or the like. Non-limiting examples of the linear carbonates include diethyl carbonate (DEC), dimethyl carbonate (DMC), dipropyl carbonate (DPC), ethyl methyl carbonate (EMC), methyl propyl carbonate (MPC), or the like. Non-limiting example of the lactone includes gamma-butyrolactone (GBL), and Non-limiting examples of the ether include dibutyl ether, tetrahydrofuran, 2-methyl tetrahydrofuran, 1,4-dioxane, diethoxy ethane, dimethoxy ethane, or the like. Non-limiting examples of the ester include methyl formate, ethyl formate, propyl formate, methyl acetate, ethyl acetate, propyl acetate, methyl propionate, ethyl propionate, propyl propionate, butyl propionate, methyl pivalate, or the like. Also, example of the sulfoxide includes dimethyl sulfoxide and example of the ketone includes poly methyl vinyl ketone. Halogen derivatives of the above electrolyte solvents may also be used. The above electrolyte solvents may be used alone or in combination.

Further, the present invention provides a method for identifying the origin or kind of the separator itself or the electrochemical device comprising the same by using the aforementioned separator.

The aforementioned separator comprises the inorganic particle(s) having a unique spectrum or color pattern according to a predetermined rule. Therefore, it is possible to identify the origin or kind of the separator itself or the electrochemical device comprising the same by using a sensor for observing a spectrum or color pattern (including the naked eye and a conventional spectrometer such as a visible light spectrometer) to check whether the spectrum or color pattern (e.g. color, brightness or saturation under a specific wavelength or chemical condition) of the inorganic particle(s) introduced into the separator conforms to the predetermined rule or not. In this manner, it is possible to identify the authenticity of the separator or electrochemical device according to the present invention. It is also possible to distinguish one type of separator or electrochemical device from the others. Therefore, any separator or electrochemical device can be prevented from being misused during a manufacturing process.

MODE FOR INVENTION

Reference will now be made in detail to the preferred embodiments of the present invention. It is to be understood that the following examples are illustrative only and the present invention is not limited thereto.

EXAMPLE 1

1-1. Manufacture of Separator

About 5 parts by weight of a polyvinylidene fluoride-chlorotrifluoroethylene copolymer (PVdF-CTFE copolymer) was added to 100 parts by weight of acetone and dissolved therein at 50° C. for about 12 hours or more to provide a polymer solution. To the preformed polymer solution, a mixture containing inorganic particles showing a blue color in the visible light region, $CoAl_2O_4$, and PVdF-CTFE in a weight ratio of 80:20 was added, and then the inorganic particles were crushed and dispersed by using a ball mill for 12 hours or more to provide slurry. In the slurry, the inorganic particles had a particle diameter of 400 nm.

Then, the slurry was coated onto the surface of the cathode and the anode obtained as described above via a dip coating process, followed by drying, to provide a separator.

1-2. Manufacture of Lithium Secondary Battery (Manufacture of Cathode)

To N-methyl-2-pyrrolidone (NMP) as a solvent, 94 wt % of $LiCoO_2$ as a cathode active material, 3 wt % of carbon black as a conductive agent and 3 wt % of PVdF as a binder were added to form slurry for a cathode. The slurry was coated on Al foil having a thickness of about 20 μm as a cathode collector, and then dried to form a cathode. Then, the cathode was subjected to roll press.

(Manufacture of Anode)

To NMP as a solvent, 96 wt % of carbon powder as an anode active material, 3 wt % of polyvinylidene fluoride (PVdF) as a binder and 1 wt % of carbon black as a conductive agent were added to form mixed slurry for an anode. The slurry was coated on Cu foil having a thickness of about 10 μm as an anode collector, and then dried to form an anode. Then, the anode was subjected to roll press.

(Manufacture of Battery)

The cathode and anode obtained as described above were stacked with the separator as described in Example 1-1 to form an assembly. Then, an electrolyte was injected into the assembly to provide a secondary battery. The electrolyte contained 1M lithium hexafluorophosphate ($LiPF_6$) dissolved in ethylene carbonate (EC) and ethyl methyl carbonate (EMC) in a volume ratio of 1:2 (EC/EMC).

EXAMPLE 2

A separator and a lithium secondary battery were provided in the same manner as described in Example 1, except that inorganic particles showing a green color in the visible light region, $Cr_2O_3$, were used instead of $CoAl_2O_4$.

EXAMPLE 3

A separator and a lithium secondary battery were provided in the same manner as described in Example 1, except that inorganic particles showing a red color in the visible light region, $Fe_2O_3$, were used instead of $CoAl_2O_4$.

EXAMPLE 4

A separator and a lithium secondary battery were provided in the same manner as described in Example 1, except that inorganic particles showing a yellow color in the visible light region, $(Ti,Ni,Sb)O_2$, were used instead of $CoAl_2O_4$.

EXAMPLE 5

A separator and a lithium secondary battery were provided in the same manner as described in Example 1, except that inorganic particles containing $CoAl_2O_4$ and $Fe_2O_3$ in a weight ratio of 33:67 were used instead of $CoAl_2O_4$.

EXAMPLE 6

A separator and a lithium secondary battery were provided in the same manner as described in Example 1, except that inorganic particles containing $CoAl_2O_4$ and $Fe_2O_3$ in a weight ratio of 67:33 were used instead of $CoAl_2O_4$.

EXAMPLE 7

A separator and a lithium secondary battery were manufactured in the same manner as in Example 1, except that $Cr_2O_3$ and $Al_2O_3$ were used instead of $CoAl_2O_4$ and the weight ratio of $Cr_2O_3$: $Al_2O_3$: PVdF was changed to 60:20:20, 30:50:20, and 10:70:20.

EXAMPLE 8

A separator and a lithium secondary battery were provided in the same manner as described in Example 1, except that SiC was used instead of $CoAl_2O_4$.

COMPARATIVE EXAMPLE 1

A separator and a lithium secondary battery were provided in the same manner as described in Example 1, except that inorganic particles showing a white color in the visible light region, alumina ($Al_2O_3$), were used instead of $CoAl_2O_4$.

EXPERIMENTAL EXAMPLE

Figure 1:
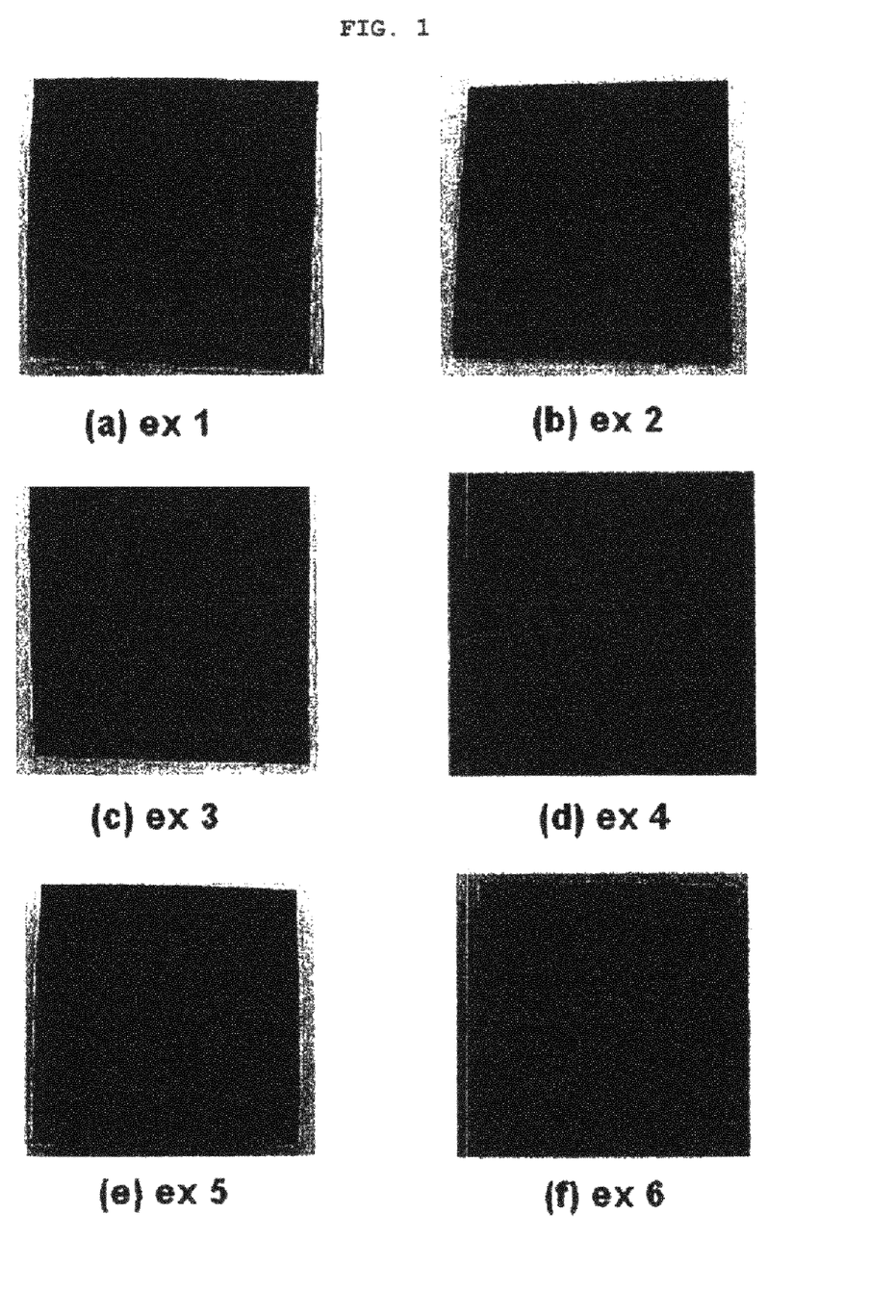
FIG. 1 is photographs of separators manufactured according to Examples 1~6.
Figure 2:
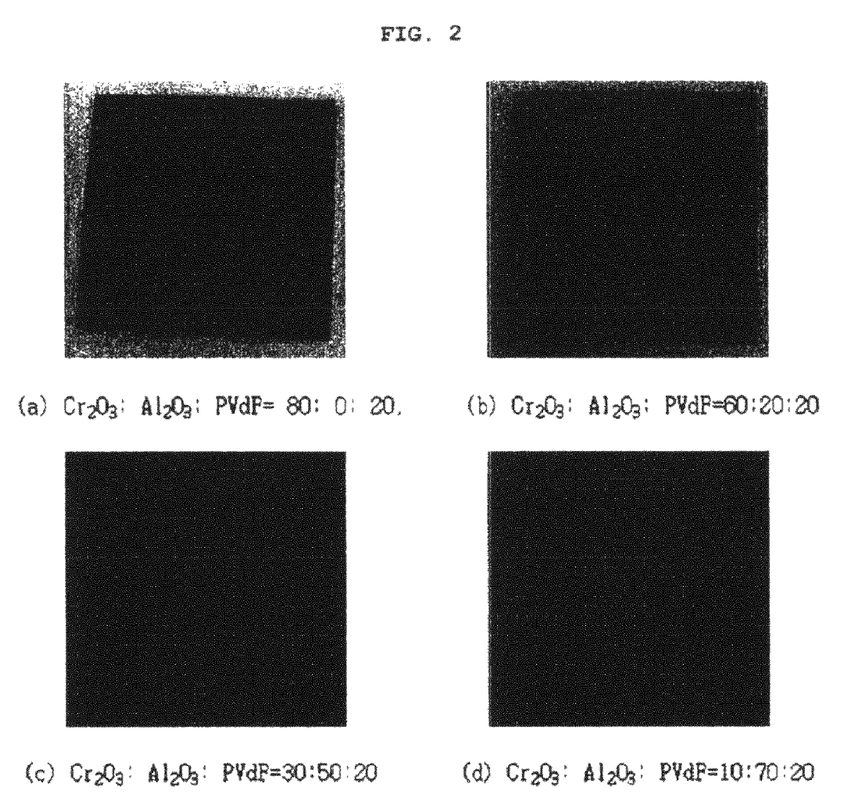
FIG. 2 is photographs of separators manufactured according to Examples of 2 and 7.
Figure 3:
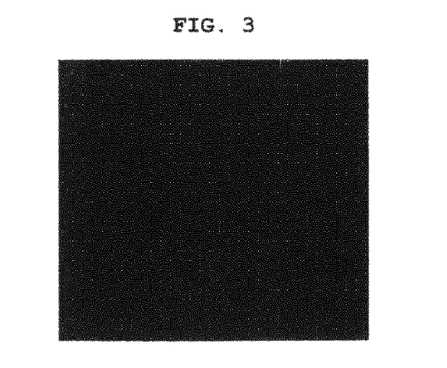
FIG. 3 is a photograph of a separator manufactured according to Example 8.
Figure 4:
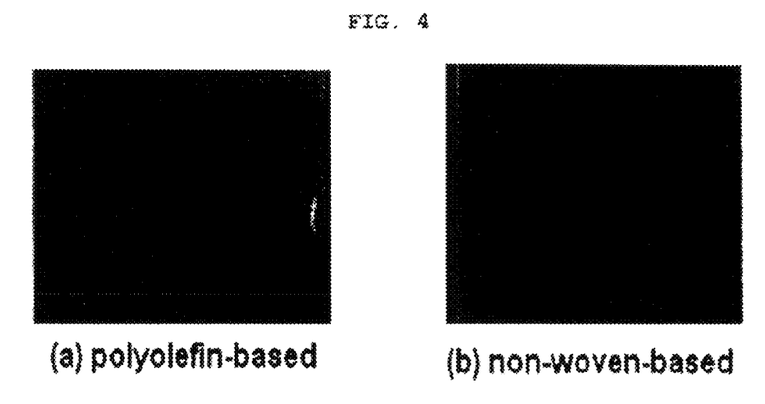
FIG. 4 is photographs of a polyolefin-based separator; and a non-woven-based separator.
Figure 5:
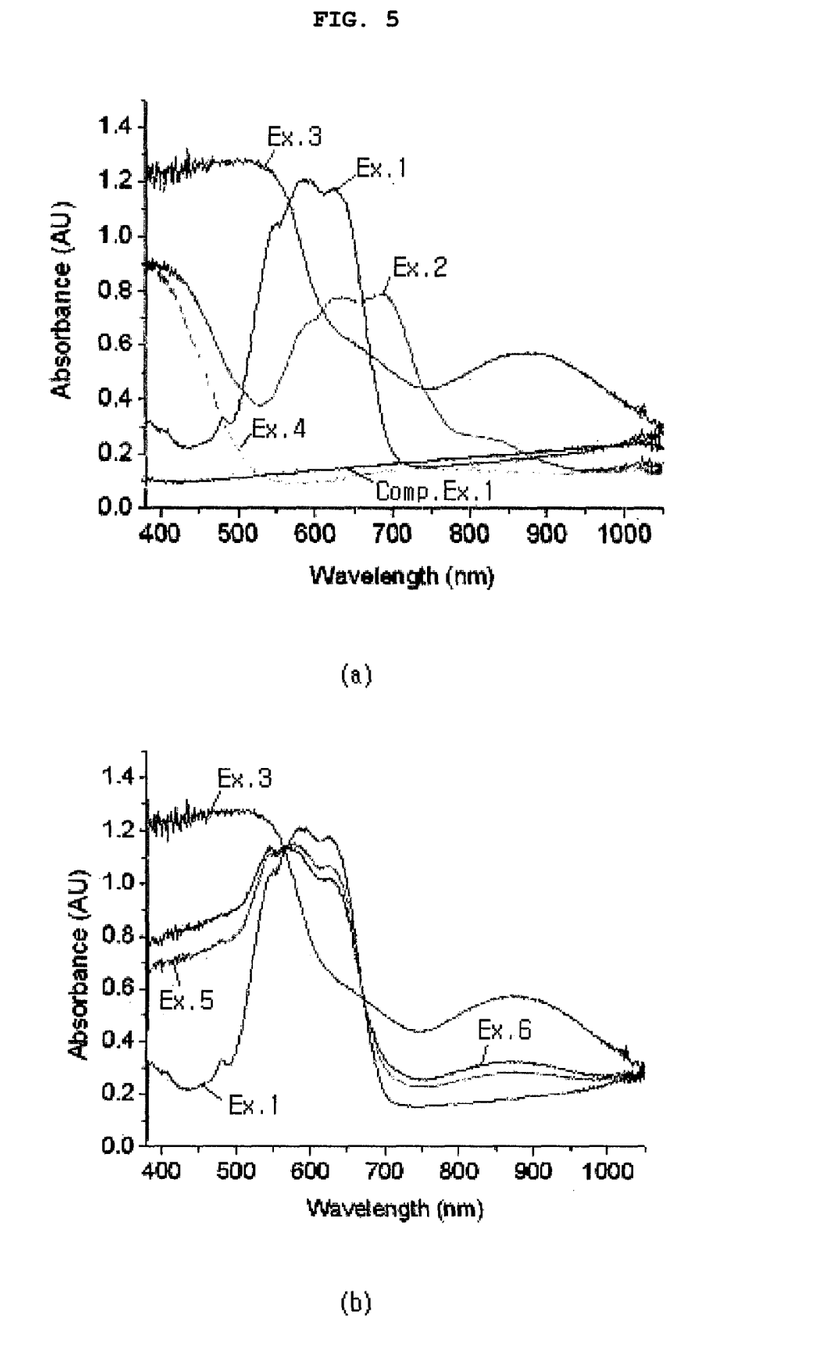
FIG. 5 is the absorption spectra of the separators according to Examples 1~6 and Comparative Example 1.

The absorption spectra of the separators according to Examples 1~6 and Comparative Example 1 were observed by using a spectrometer. The results are shown in FIG. 5. It can be seen from the experimental results that the separator introduced the inorganic particle(s) according to the present invention shows a different spectrum depending on the kind and content of the inorganic particle(s). Such a specific spectrum can function as a means for identifying the separator itself or the electrochemical device using the same.

Meanwhile, FIGS. 1, 2, 3 and 4 show the photographic views of the separators according to Examples 1~8 and polyolefin-based separator, taken in the visible light range. It can be seen from the above results that the separator according to the present invention can be identified sufficiently with the naked eye.

INDUSTRIAL APPLICABILITY

As can be seen from the foregoing, according to the present invention, it is possible to identify the origin or kind of the separator itself or the electrochemical device using the same separator without any modification or addition in the structure of the device. Thus, it is possible to identify the authenticity of the separator or electrochemical device according to the present invention. It is also possible to distinguish one type of separator or electrochemical device from the others. Therefore, any separator or electrochemical device can be prevented from being misused during a manufacturing process.

Although several preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A separator comprising inorganic particles having either or both of a unique spectrum and color pattern according to a predetermined rule, wherein either or both of the spectrum and the color pattern of the separator allow identification of the origin or kind of the separator itself or an electrochemical device comprising the same separator, wherein the inorganic particles are subjected to surface treatment with a dye having either or both a unique spectrum and color pattern.

2. The separator as claimed in claim 1, wherein the inorganic particles are selected from the group consisting of:
   (i) inorganic particles having a unique spectrum or color pattern in the visible light range;
   (ii) inorganic particles having a unique spectrum or color pattern in the non-visible light range; or
   (iii) inorganic particles having a unique spectrum or color pattern under a specific chemical condition.

3. The separator as claimed in claim 1, wherein the inorganic particles are selected from the group consisting of $Al_2O_3$, ZnO, ZnS, $SiO_2$, $ZrO_2$, $SnO_2$, $CeO_2$, MgO, CaO, $Y_2O_3$, $TiO_2$, $Sb_2O_3$, $BaTiO_3$, $SrTiO_3$, $Pb(Zr,Ti)O_3$ (PZT), $Fe_3O_4$, (Co, Ni)O—(Cr, Fe)$_2O_3$, $PbCrO_4$, ZnCrO4, $BaCrO_4$, CdS, $FeO(OH)nH_2O$, $TiO_2$—NiO—$Sb_2O_3$, $Pb(CN)_2$, $Ca_2PbO_4$, Al, Fe, Sn-2PbO—$Sb_2O_5$, V—$SnO_2$, V—$ZrO_2$, Pr—$ZrSiO_4$, $CrSbO_4$ or $Cr_2WO_6$—$TiO_2$, $ZrSO_4$ coated CdS or (CdZn)S, $PbCrO_4$ PbO, $PbCrO_4$ $PbMoO_4$, $PbSO_4$, $Fe_2O_3$+FeO, $Fe_2O_3$+$MnO_2$+$Mn_3O_4$, ZnO.(Al, Cr, Fe)$_2O_3$, $Fe_2O_3$, $Pb_3O_4$, HgS, CdS+CdSe, CdS+HgS, 2 $Sb_2S_3$ $Sb_2O_3$, $Co_3(PO_4)_2$, $CO_3$ $(PO_4)_2$ $4H_2O$, $CO_3$ $(PO_4)_2$ $8H_2O$, 3NaAl $SiO_4$ $Na_2S_2$, $Fe_4$ [Fe $(CN_6)_3$] $nH_2O$, CoO $nAl_2O_3$, CoO $nSnO_2$ $mMgO$ (n=1.5~3.5, m=2~6), $Co_3O_4$+$SiO_2$+$Al_2O_3$+$Fe_2O_3$+NiO+MnO, CoO-$nAl_2O_3$ or (Co, Zn) O-$nAl_2O_3$, 2(Co, Zn)O.$SiO_2$,V—$ZrSiO_4$, $Cr_2O_3$, $Cr_2O(OH)_4$, $Cu(CH_3 CO_2)^2$ $3CuO(AsO_2)_2$, CoO—ZnO—MgO, (Co, Zn)O.(Al, Cr)$_2O_3$, $3CaO$—$Cr_2O_3$.$3SiO_2$, (Al, Cr)$_2O_3$, Sb—$SnO_2$, Co,Ni—$ZrSiO_4$, Mn,P-α-$Al_2O_3$, ZnO.(Al, Cr)$_2O_3$, Cr—$CaO.SnO_2$. $SiO_2$, Fe—$ZrSiO_4$, Cr,Co—$CaO.SnO_2.SiO_2$, $ZrSiO_4$ coated Cd(S,Se), ZnS, $Zn_2SiO_4$, (Zn,Cd)S, CaS, SrS, $CaWO_4$, SiC, and $Si_3N_4$.

4. The separator as claimed in claim 1, wherein the inorganic particles have a size of 0.001 μm to 10 μm.

5. The separator as claimed in claim 1, further comprising polymers capable of interconnecting and fixing the inorganic particles.

6. The separator as claimed in claim 5, wherein the polymers have a solubility parameter of 15~45 $MPa^{1/2}$.

7. The separator as claimed in claim 5, wherein the polymers are selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, and polyimide.

8. The separator as claimed in claim 5, wherein the inorganic particles and polymers are used in a weight ratio of 10:90 to 99:1.

9. The separator as claimed in claim 1, wherein the separator comprises an inorganic particle-containing layer on at least one area of the separator selected from the group consisting of a surface of a porous substrate and a porous part of the substrate.

10. The separator as claimed in claim 9, wherein the porous substrate is made of at least one selected from the group consisting of high density polyethylene, low density polyethylene, linear low density polyethylene, ultrahigh molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro, and polyethylenenaphthalene.

11. The separator as claimed in claim 1, wherein the separator has a porous structure formed due to the interstitial volume between the inorganic particles, the inorganic particles being physically interconnected and fixed to each other.

12. The separator as claimed in claim 11, wherein the inorganic particles are physically interconnected and fixed to each other by polymers.

13. A method for manufacturing the separator as defined in claim 1, the method comprising a step of forming a specific pattern by coating inorganic particles having either or both a unique spectrum and color pattern on at least one area selected from the group consisting of a surface of a porous substrate and a porous part of the substrate.

14. The method as claimed in claim 13, wherein the coating is carried out by a sputtering method.

15. The method as claimed in claim 13, further comprising a step of detaching the porous substrate or detaching the porous substrate and compressing, after forming a specific pattern.

16. An electrochemical device comprising an anode, a cathode, and the separator as defined in claim 1.

17. A method for identifying the separator of claim 1 or an electrochemical device comprising the separator comprising a step of checking either or both of a unique spectrum and color pattern of the separator.

18. The method as claimed in claim 17, wherein the step of checking utilizes a sensor.

19. A method for manufacturing a separator comprising an inorganic particles having either or both a unique spectrum and color pattern according to a predetermined rule, wherein either or both of the spectrum and the color pattern of the separator allow identification of the origin or kind of the separator itself or an electrochemical device comprising the same separator, the method comprising a step of forming a specific pattern by coating inorganic particles having either or both a unique spectrum and color pattern on at least one area selected from the group consisting of a surface of a porous substrate and a porous part of the substrate.

* * * * *